(12) United States Patent
Herring et al.

(10) Patent No.: US 9,327,484 B2
(45) Date of Patent: May 3, 2016

(54) PROCESS OF MAKING LAMINATED SHEET AND PRODUCT MADE BY THE PROCESS

(75) Inventors: William A. Herring, Valparaiso, IN (US); Shannon K. Crawford-Taylor, Merrillville, IN (US); Suwit (John) Sangkaratana, Crown Point, IN (US)

(73) Assignee: Illinois Tool Works Inc., Glenview, IL (US)

( * ) Notice: Subject to any disclaimer, the term of this patent is extended or adjusted under 35 U.S.C. 154(b) by 178 days.

(21) Appl. No.: 12/455,622

(22) Filed: Jun. 4, 2009

(65) Prior Publication Data

US 2009/0314424 A1    Dec. 24, 2009

Related U.S. Application Data

(63) Continuation of application No. 10/850,953, filed on May 21, 2004, now Pat. No. 7,544,266.

(51) Int. Cl.
*B32B 38/14*    (2006.01)
*B32B 38/18*    (2006.01)
(Continued)

(52) U.S. Cl.
CPC ........... *B32B 38/1841* (2013.01); *B32B 38/145* (2013.01); *B41M 7/0027* (2013.01); *B42D 25/00* (2014.10); *B32B 38/14* (2013.01); *B32B 2327/06* (2013.01); *B32B 2367/00* (2013.01); *B32B 2425/00* (2013.01); *B32B 2429/00* (2013.01); *B32B 2519/00* (2013.01); *B42D 15/02* (2013.01); *B42D 15/027* (2013.01); *B42D 15/045* (2013.01); *B42D 25/45* (2014.10); *B42D 25/48* (2014.10); *B42D 2033/30* (2013.01); *G09F 3/02* (2013.01); *G09F 2003/0202* (2013.01); *G09F 2003/0255* (2013.01); *G09F 2003/0276* (2013.01); *Y10T 156/1052* (2015.01);
(Continued)

(58) Field of Classification Search
CPC ................... Y10T 156/1052; Y10T 156/1077; Y10T 156/1089; Y10T 156/1734; Y10T 156/1744; Y10T 156/1093; Y10T 428/24868; Y10T 428/24876; B42D 15/02; B42D 15/027; B42D 15/045; B42D 2033/30; B42D 25/00; B42D 25/45; B42D 25/48; B32B 38/14; B32B 38/145; B32B 2327/06; B32B 2367/00; B32B 2425/00; B32B 38/1841; B32B 2429/00; B32B 2519/00; B41M 7/0027; G09F 3/02; G09F 2003/0255; G09F 2003/0276; G09F 2003/0202
USPC .......................... 156/446, 458, 250, 269, 277
See application file for complete search history.

(56) References Cited

U.S. PATENT DOCUMENTS 3,498,788 A * 3/1970 Haas ....................... G03C 8/423
                                                                          283/109
3,711,353 A * 1/1973 Zimmer ....................... 156/267
(Continued)

OTHER PUBLICATIONS

Letter from Billhofer U.S.A. Inc. to Waytek Corporation dated Apr. 21, 2003 (10 pages).
(Continued)

*Primary Examiner* — Sonya Mazumdar
(74) *Attorney, Agent, or Firm* — Patula & Associates, P.C.

(57) ABSTRACT

A process of making an improved sheet/card laminate for packaging, signage, displays, transaction cards, ID cards and the like. The process comprises registering flat sheets to a film and then laminating the film or transferring coating(s) from the film to the individual, generally flat sheets via an adhesive. The film or coating(s) may include layered security, functional and/or decorative features.

26 Claims, 5 Drawing Sheets

(51) Int. Cl.
    *B32B 37/00*     (2006.01)
    *B32B 37/14*     (2006.01)
    *G09F 3/02*     (2006.01)
    *B42D 25/40*     (2014.01)
    *B42D 25/00*     (2014.01)
    *B32B 38/00*     (2006.01)
    *B41M 7/00*     (2006.01)
    *B42D 15/04*     (2006.01)
    *B42D 15/02*     (2006.01)
    *B42D 25/45*     (2014.01)
    *B42D 25/48*     (2014.01)

(52) U.S. Cl.
    CPC ...... *Y10T156/1077* (2015.01); *Y10T 156/1089* (2015.01); *Y10T 156/1093* (2015.01); *Y10T 156/1734* (2015.01); *Y10T 156/1744* (2015.01); *Y10T 428/24868* (2015.01); *Y10T 428/24876* (2015.01)

(56) References Cited

U.S. PATENT DOCUMENTS

| | | | | |
|---|---|---|---|---|
| 3,770,550 | A * | 11/1973 | Levitan | 156/498 |
| 4,027,345 | A * | 6/1977 | Fujisawa et al. | 8/468 |
| 4,097,279 | A * | 6/1978 | Whitehead | 430/39 |
| 4,100,011 | A * | 7/1978 | Foote | 156/273.1 |
| 4,287,285 | A * | 9/1981 | Mosehauer | 430/117.4 |
| 4,441,945 | A * | 4/1984 | Moraw et al. | 156/108 |
| 4,506,915 | A * | 3/1985 | Haghiri-Tehrani | B32B 37/226 283/108 |
| 4,560,426 | A * | 12/1985 | Moraw et al. | 156/64 |
| 4,594,125 | A * | 6/1986 | Watson | 156/516 |
| 4,684,795 | A * | 8/1987 | Colgate, Jr. | 235/457 |
| 4,856,857 | A * | 8/1989 | Takeuchi | G03H 1/0252 283/72 |
| 4,971,646 | A | 11/1990 | Schell et al. | |
| 4,992,130 | A * | 2/1991 | Vermeulen et al. | 156/307.5 |
| 5,037,101 | A * | 8/1991 | McNulty | 273/139 |
| 5,261,987 | A * | 11/1993 | Luening et al. | 156/235 |
| 5,318,816 | A * | 6/1994 | Yin et al. | 428/41.8 |
| 5,449,200 | A * | 9/1995 | Andric | B32B 27/10 156/277 |
| 5,472,932 | A * | 12/1995 | Fujimura et al. | 503/227 |
| 5,489,567 | A * | 2/1996 | Koshizuka et al. | 503/227 |
| 5,518,569 | A | 5/1996 | Achilles et al. | |
| 5,637,174 | A * | 6/1997 | Field et al. | 156/256 |
| 5,665,194 | A * | 9/1997 | Kay | B32B 38/10 156/285 |
| 5,874,145 | A * | 2/1999 | Waller | 428/42.1 |
| 5,890,742 | A * | 4/1999 | Waller | 283/67 |
| 6,264,782 | B1 * | 7/2001 | Oshima et al. | 156/237 |
| 6,283,188 | B1 * | 9/2001 | Maynard | B32B 37/0015 156/351 |
| 6,318,757 | B1 * | 11/2001 | Ritchie et al. | 283/75 |
| 6,491,782 | B1 * | 12/2002 | Jaynes | 156/277 |
| 6,837,955 | B1 * | 1/2005 | McCarthy et al. | 156/248 |
| 7,422,794 | B2 * | 9/2008 | LaBrec | 428/480 |
| 2003/0124451 | A1 * | 7/2003 | Camillus | G03F 7/002 430/138 |
| 2004/0066441 | A1 * | 4/2004 | Jones | B41J 3/60 347/101 |
| 2004/0188009 | A1 * | 9/2004 | McKillip | 156/252 |
| 2008/0169640 | A1 * | 7/2008 | Scheir | 283/94 |

OTHER PUBLICATIONS

Purchase Order/Invoice Documents to/from UV Color Incorporated and Total Register Inc. dated between Sep. 5, 2000 and Mar. 1, 2001 (4 pages).

"Harry Potter Trading Card Game" Sheet (front and back) dated Jun. 2001 (2 pages).

\* cited by examiner

PROCESS OF MAKING LAMINATED SHEET AND PRODUCT MADE BY THE PROCESS

This application is a continuation of U.S. patent application Ser. No. 10/850,953 filed May 21, 2004, now U.S. Pat. No. 7,544,266 issued Jun. 9, 2009.

The present disclosure relates to an improved process of making laminated sheets with and without registered imagery and the product made by the process, and in particular, a process for the production of laminated sheets for transaction cards (such as credit cards), license/identification cards and the like. A further application of the present disclosure is the use of laminated sheets for packaging, signage, displays and the like. Specifically, the present disclosure relates to a process of laminating a film or foil layer to a substrate layer to produce sheets of laminated stock.

BACKGROUND OF THE INVENTION

Laminated sheets and cards are used in many industries for many purposes. Typical uses of laminated sheets include packaging, banners, decorative/informational signs, point of purchase displays and the like. Typical uses of laminated cards made from these sheets include credit cards, driver's licenses, ID cards, phone cards, gift cards, loyalty cards, game cards, key cards and the like. These laminated sheets and cards are constructed from multiple layers of plastic or paper based substrates, holographic, metallized, printed or clear films or foils, and adhesives and coatings. These laminate cards also usually include printing, graphics, and/or other features such as security elements.

An example of such laminated cards and the method of making the same is discussed in U.S. patent No. U.S. Pat. No. 6,471,128 B1 ("the '128 patent") issued to Corcoran et al. on Oct. 29, 2002. The entire disclosure of the '128 patent is herein incorporated by reference.

Difficulties arise in the production of these laminated cards, which must ultimately meet certain standards, such as with respect to peel strength or resistance to delamination. Further, defects such as bubbles or wrinkles between layers, and warping, curling or bowing of the final laminated cards may occur during or after the manufacturing process. Warping may occur as a result of a roll laminating process wherein rolls of material constituting each layer are adhered together as they are unrolled, coated and fed into a lamination press with unbalanced tension. Further, roll-to-roll laminating requires the heavier plastic materials to be wound up and thus they take on roll set curl (i.e. a memory of having been wound up into a coil).

A balanced, symmetrical construction is optimal in order to prevent curling or bowing in the finished cards. Thus, even if only one side of the card requires a laminated film, such as a metallized film or diffraction surface, the opposite side of the composite construction should have a matching film type (though may be clear, printed, metallized, etc.). Accordingly, one such known card laminate comprises a split core substrate of two adjacent layers of 12 mil (300 micron) white PVC copolymer core stock. Laminated to one side of each of the PVC split cores is 0.75 gauge (19 micron) or 0.92 gauge (23 micron) PET holographic, metallized, brushed, coated, printed or clear film, with or without tie coat. A tie coat or primer may be used to improve the bond between the adhesive and the metallized surface of the film. This lamination involves a roll to roll lamination process using water-based aliphatic polyester urethane adhesive with a $T_{act}$ of 250° F.

The resulting card laminate is then sheeted off-line in a process whereby sections of the laminate are cut to a desired length, for example to a size of 24"×28.5" and then using a guillotine or other cutting method to square the sheet. Registration of the holographic imagery to the sheet is not instrument controlled or automated. These sheets are next printed, and then fused back to back with two adhesive coated 2 mil (50 micron) PVC overlays on top and bottom to form the outer skins in a second and final lamination step, which is typically performed by the card manufacturer. The printed sheets are then reduced to card size in any manner known in the art. Features such as signature panels, holograms and/or decorative foils are often applied to the individual cards as required or desired. These cards are then embossed on standard personalization equipment.

The above described card laminate and process of producing the same has many benefits, such as heat resistant holography and metallization, bright holography, stable oriented PET, excellent bond strength of coatings to PET to prevent delamination, and tie coat on metal to improve bond between adhesive and metal. However, the above described card laminate and process of producing the same has many drawbacks as well. For example, PVC in roll form due to roll set curl causes sheet curl and rippled edges, and PVC in roll form may limit certain product constructions. The roll-to-roll laminating process requires specialty sheeting to achieve registered imagery, heavier adhesive coat weights that can create visual defects, and final lamination cycle required to activate adhesive and achieve peel strength requirements for the typical end uses, such as ANSI/ISO specifications.

The sheet and card laminate and process of the present disclosure, however, overcomes the problems and disadvantages of prior art sheet and card laminate and methods of producing the same. The present disclosure provides for a cost-effective and time saving process for making card laminate which has improved characteristics and features over known prior art sheet and card laminates.

SUMMARY OF THE INVENTION

The method of one disclosed embodiment comprises the steps of providing generally flat sheets of a substrate, and feeding the generally flat sheets to a lamination area wherein a film or foil layer is registered with and laminated to the generally flat sheets to produce improved laminated sheets to generate transaction cards, license cards, ID cards, phone cards, gift cards, loyalty cards, game cards, key cards and the like. Further, these improved laminated sheets may also be used for packaging, signage, displays and the like. The laminated sheets of the disclosed embodiment exhibit improved characteristics and benefits over known prior art, including with respect to the above described curling or bowing, which is effectively minimized or eliminated by the method disclosed herein. The films may or may not include a variety of layered security, functional and/or decorative features which are applied to or incorporated in the film or foil before or during the laminating process.

Accordingly, it is the principal object of the disclosed embodiment(s) to provide a method for making improved laminated sheets for transaction cards, license cards, ID cards, phone cards, gift cards, loyalty cards, game cards, key cards and the like. Further, these improved laminated sheets may also be used for packaging, signage, displays and the like.

It is a further object of the disclosed embodiment(s) to provide an improved card laminate for transaction cards, license cards, ID cards, phone cards, gift cards, loyalty cards, game cards, key cards and the like. Further, these improved laminated sheets may also be used for packaging, signage, displays and the like.

It is also an object of the disclosed embodiment(s) to provide a method for making sheets of card laminate by laminating a film or foil layer to generally flat sheets of a plastic or paper based substrates to produce an improved sheet or card laminate.

It is another object of the disclosed embodiment(s) to overcome the problems and disadvantages of prior art sheet or card laminates and methods of producing sheet or card laminates, and to realize improvements and benefits there over.

Numerous other advantages and features of the disclosed embodiment(s) will become readily apparent from the detailed description, from the claims and from the accompanying drawings in which like numerals are employed to designate like parts throughout the same.

BRIEF DESCRIPTION OF THE DRAWINGS

A fuller understanding of the foregoing may be had by reference to the accompanying drawings wherein.

DETAILED DESCRIPTION OF THE DISCLOSED EMBODIMENT(S)

Figure 1:
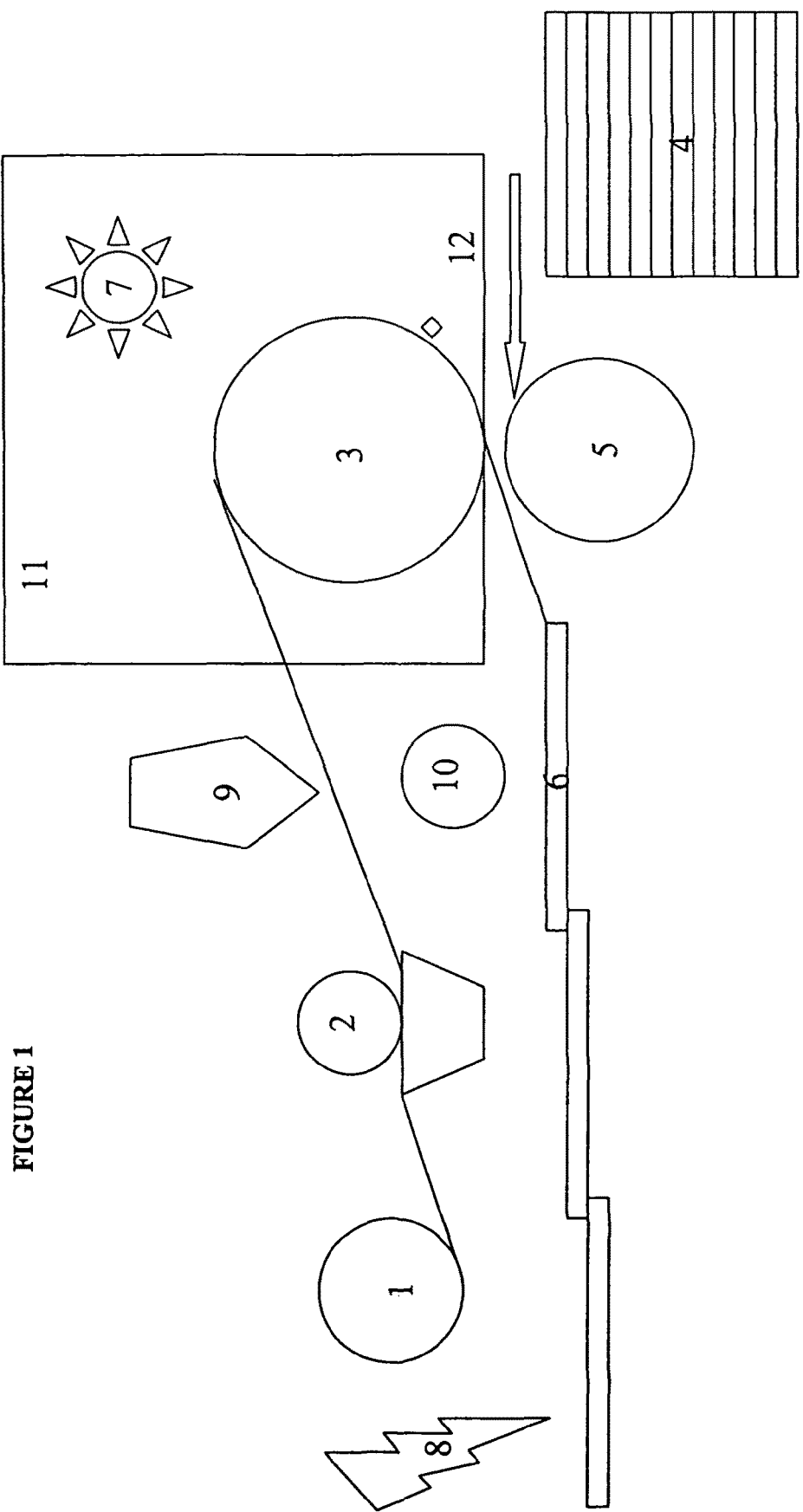
FIG. 1 is a schematic diagram illustrating the process of the disclosed embodiment.

While the process and the product produced by the process disclosed herein are susceptible of embodiment in many different forms, there is shown in the drawings and will be described herein in detail one or more preferred embodiments. It should be understood, however, that the present disclosure is to be considered an exemplification of the principles of the invention and is not intended to limit the spirit and scope of the invention and/or claims of the embodiment(s) illustrated.

FIG. 1 is a schematic diagram illustrating the process of the disclosed embodiment. The process involves generally the lamination of a film or foil layer onto individual sheets of a substrate or core layer. The film or foil layer may have at least one side which is holographic, metallized (vapor deposited metals or other compounds), brushed, coated, printed or clear film, with or without tie coats. Additionally, a variety of layered security, functional and/or decorative features are selectively applied to the film or foil before or during the laminating process.

Accordingly, in the illustrated embodiment, a roll of film 1, which selectively has applied thereto a variety of layered security, functional and/or decorative features (see FIG. 5), is unrolled and passes through a coating station 2, wherein the film 1 is coated in-line with laminating adhesive. The coated film next passes around a heated drum 3 in an oven 11, where the adhesive coated film is dried. Alternatively, in place of the coating station, a heat seal adhesive is pre-coated onto the film, and then activated by the oven and heated drum. In another embodiment, the adhesive can be radiation curable, and in place of drying the adhesive in the oven, the adhesive is cross-linked by exposing it to a UV light 7 prior to or after lamination, or by irradiating the sheets with an electron beam ("EB") source 8 after lamination. In yet another embodiment, the film can be coated in-line with a hot melt adhesive via a hot melt/extrusion die 9.

A backing roller 5 is located proximate the oven and heated drum to form a laminating nip. A generally flat stack of sheets 4 of the substrate or core stock are suitably supported adjacent the backing roller 5. The sheets 4 are fed into the laminating nip by any suitable sheet feeding mechanism and/or conveyor system (not shown), as is known in the art of sheet feeding. As the sheets are fed into the laminating nip, a registration unit 12 registers the sheets 4 with the film 1.

Figure 2:
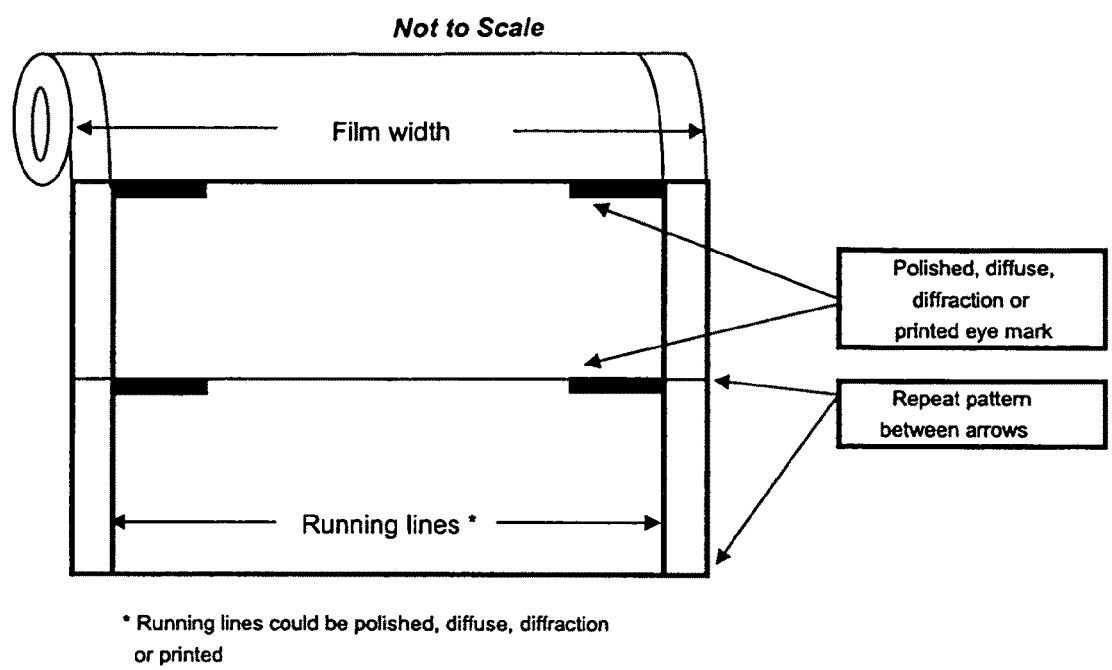
FIG. 2 is an illustration depicting an embodiment of the registration layout on the film.

Preferably, the film 1 includes a distinguishing mark, imagery and/or running line, as illustrated in FIG. 2. The registration unit 12 reads the imagery, registration mark or line and registers it to the individual sheets 4 by synchronizing the feeding of the sheets with the passage of the film into the nip. More specifically, as film 1 travels around drum 3, the sheets 4 are carried on a conveyor towards the lamination nip (point between drum 3 and backing roller 5). The registration unit 12 detects the eye mark or image on film 1 and signals a drive to adjust the positioning of sheet 4 so that the registration mark is placed on the leading edge of sheet 4 or other desired, repeatable position.

FIG. 2 shows an example of the positioning of registration eye marks and running lines in a roll of film. Examples of eye marks or images or running lines include polished (polished or buffed into an embossing shim), diffuse (physically scratched, chemically etched or sand blasted into an embossing shim), diffraction (mark/line on embossing shim which diffracts light (into a rainbow)), or printed (printed onto film).

The registration unit 12 optically detects the contrast between a distinguishing mark (eye mark or running line) or image (logo, picture, etc.) and the adjacent background, for example, the contrast between a smooth polished eye mark on a holographic background, a diffuse or diffraction mark next to a holographic or metallized area, the contrast between an embossed image itself and the background, or an eye mark or running line printed with an ink density different than the adjacent area. Further, the registration unit 12 can be moved perpendicular to web direction to read the distinguishing mark across the film.

After registration, the film 1 is then laminated onto the sheets 4 as they pass through the nip in register, thus producing improved sheets or card laminate 6. The sheets or card laminate 6 are then separated, for example, by cutting or notching the film with a moving blade at the point where the adjacent sheets overlap, or notching the film with a perforation wheel and propagating a tear or cut, and stacked. Any suitable cutting and/or separating devices may be used as is known in the art. Preferably, the film is laminated such that the holographic, metallized (vapor deposited metals or other compounds), brushed, coated or printed, with or without tie coats side of the film is coated with the adhesive. It should be understood however that the film can be laminated with the above features facing up, or those features may be on both sides of the film to be laminated.

In an alternate embodiment, the film is a hot stamp or cold transfer product. An adhesive is applied (with total or partial or pattern coverage) and cured via one of the above described methods. The sheet is then registered and fed in synch with the film into the lamination nip. In this instance, the adhesive removes selective portions or all of the coating or coatings from the film, effectively transferring, in register, the coating(s) or selective portions thereof to the sheets. After transfer of the coating(s) or portions thereof, the spent film is removed from the sheets and wound onto a rewind drum 10. The laminated/decorated sheets are then separated, collected and stacked.

Figure 3:
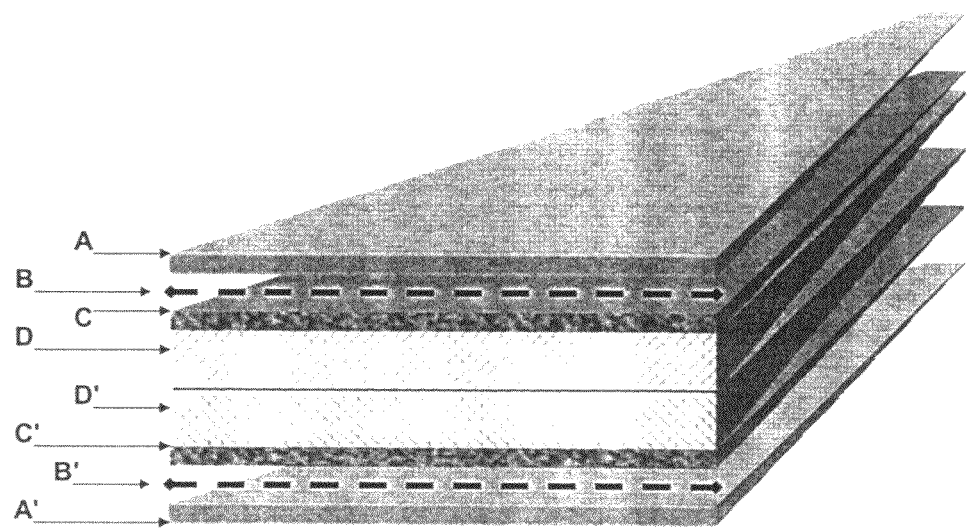
FIG. 3 is an illustration depicting an embodiment of the laminate sheet and card construction.

FIG. 3 illustrates one embodiment of the laminate sheet and card construction. A sheet or card laminate from the above described process, represented by C, D, D' and C', where D and D' are the sheets 4, and C and C' are the foil 1, may be compiled with additional layers, illustrated as layers A, B, B' and A', to form a composite which may then be cut or punched into individual units of varying size and shapes. The various layers of the illustrated embodiment of FIG. 3 are defined as follows.

Component A is a protective overlay, typically PVC (polyvinyl chloride) or PETG (glycol modified polyethylene terephthalate) but could be other materials, or component A may not be used.

Component B is on the surface of Component C, typically several layers of graphic print and indicia, or component B may not be used.

Component C is typically a PET (polyethylene terephlathate) film containing one or a combination of layered functional, decorative and/or security features, though the film could also be APET (amorphous polyethylene terephthalate), PBT (polybutadiene terephthalate), PETG, OPP (oriented polypropylene) and other olefins, PVC, acrylic, ABS (acrylonitrile butadiene styrene terpolymer), HIPS (impact modified polystyrene), PS (polystyrene), PC (polycarbonate), co-extruded films and the like.

Component D is typically PVC or PETG but could be APET, PC, PS, ABS, acrylic, olefins such as PE (polyethylene) and PP (polypropylene), HIPS, paper, board stock and the like.

Component D' is typically PVC or PETG but could be APET, PC, PS, ABS, acrylic, olefins such as PE and PP, HIPS, paper, board stock and the like, or not used.

Component C' is typically a PET film containing one or a combination of layered functional, decorative and/or security features, though the film could also be APET, PBT, PETG, OPP and other olefins, PVC, acrylic, ABS, HIPS, PS, PC, co-extruded films and the like.

Component B' is printed on the surface of Component C', typically indicia or graphic print, or component B' may not be used.

Component A' is a protective overlay, typically PVC or PETG but could be other materials, or component A' may not be used.

Figure 4:
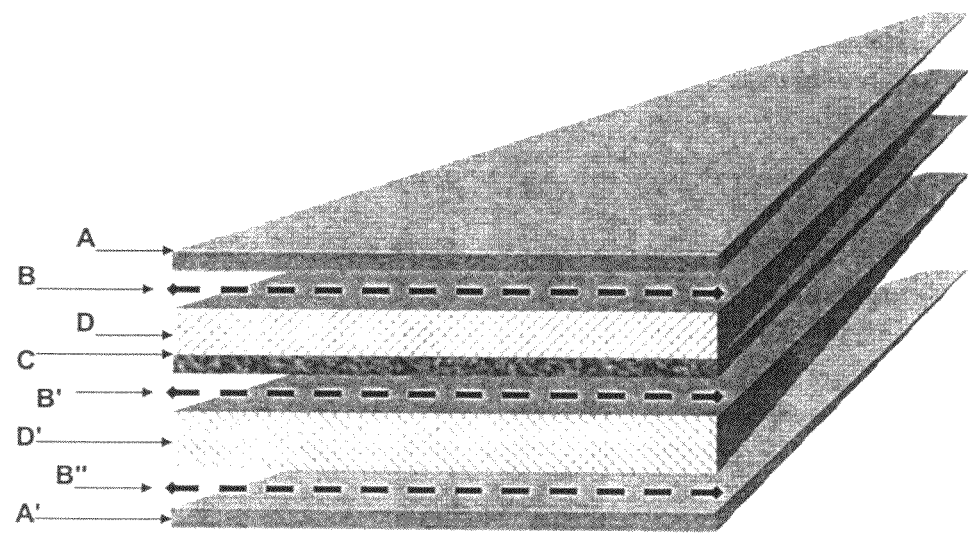
FIG. 4 is an illustration depicting another embodiment of the laminate sheet and card construction.

FIG. 4 another embodiment of the laminate sheet and card construction. A sheet or card laminate from the above described process, represented by C, D and D', where D and D' are the sheets 4, and C is a foil 1, may be compiled with additional layers, illustrated as layers A, B, B', B" and A', to form a composite which may then be cut or punched into individual units of varying size and shapes. The various layers of the illustrated embodiment of FIG. 4 are defined as follows.

Component A is a protective overlay, typically PVC but could be other materials, or component A may not be used.

Component B is on the surface of Component D, typically graphic or indicia print, or component B may not be used.

Component D is typically PVC or PS but could be PETG, APET, PC, ABS, acrylic, olefins such as PE and PP, HIPS, paper, board stock and the like.

Component C is typically a PET film containing one or a combination of layered functional, decorative and/or security features, though the film could also be APET, PBT, PETG, OPP and other olefins, PVC, acrylic, ABS, HIPS, PS, PC, co-extruded films and the like.

Component B' is on the surface of Component C, typically graphic or indicia print, or component B' may not be used.

Component D' is typically PVC or PS but could be PETG, APET, PC, ABS, acrylic, olefins such as PE and PP, HIPS, paper, board stock and the like.

Component B" is on the surface of Component D', typically graphic or indicia print, or component B" may not be used.

Component A' is a protective overlay, typically PVC but could be other materials, or component A' may not be used.

The base film (Component C or C') can be any material described herein, and may selectively include at least one security, functional or decorative feature or combinations thereof. These features can be layered on the film, become buried in the construction, and the integrity of the composite is maintained throughout the sheet lamination process. The laminated sheets or cards subsequently hold up to secondary high temperature lamination processes to achieve product specifications as called out for each specific end use.

Some examples of decorative features are tint coats, texture coats, graphics, woodgrain or marble patterns printed onto the film by a number of printing methods known in the industry—roto gravure, flexo, screen printing, offset and digital using water or solvent based thermoplastic inks, radiation curable inks, dye sublimation and the like. Additionally the film may be vacuum metallized (with metal or other compounds) with or without tint coats. A decorative feature could also be hot stamped or transferred onto the film in a separate operation.

Some examples of functional features are performance coatings imparting heat, chemical, UV and abrasion resistance and IR absorbance, as well as modifying the coefficient of friction (slip coat) or antistatic property. Coatings such as these could be coated or applied to the base film in any of the methods described herein.

Any one or a combination of security features described herein may be added to the film. Holographic imagery in a wallpaper pattern or specifically registered images could be embossed into either heat resistant or normal holographic base coatings using embossing techniques known to the industry. Embossed film may be coated with vacuum deposited metals or other compounds (such as aluminum oxide, zirconium oxide, titanium dioxide), resulting in products commonly classified as metallized or high refractive index. The film could also be coated with optically variable coatings. Further, these products could undergo a selective demetallization process, either direct (metal removing solution printed directly onto metallized surface) or indirect (mask printed in areas to retain metal then film passed through the demetallizing solution), in which a portion of the vacuum metallized layer is removed in register to an embossed holographic image. As an extension to this, the resulting demetallized layer could be coated with a clear or tint layer to index out the embossed image and thereafter re-metallized, resulting in a combination of holographic imagery with an unembossed metallized layer of a different color. The order in which the embossing, metallization, demetallization, indexing out and re-metallization could occur is not fixed. Also, embossed images can be 2D or 3D, morphing holograms, contain microtext, bar codes or other machine-readable features. Finally, security inks such as though identified herein can be printed in register to any of the above-described films prior to laminating in register to sheet stock. Security inks could be overt or covert and fall into general categories of UV fluorescent, phosphorescent, pearlesence, glow-in-the-dark, IR absorbing/reflecting, color shifting (OVI), thermochromic, photochromic, magnetic, containing taggants/markers/tracers or be tamper evident. Inks could be printed in patterns such as barcodes, readable images, arrays and the like.

Figure 5:
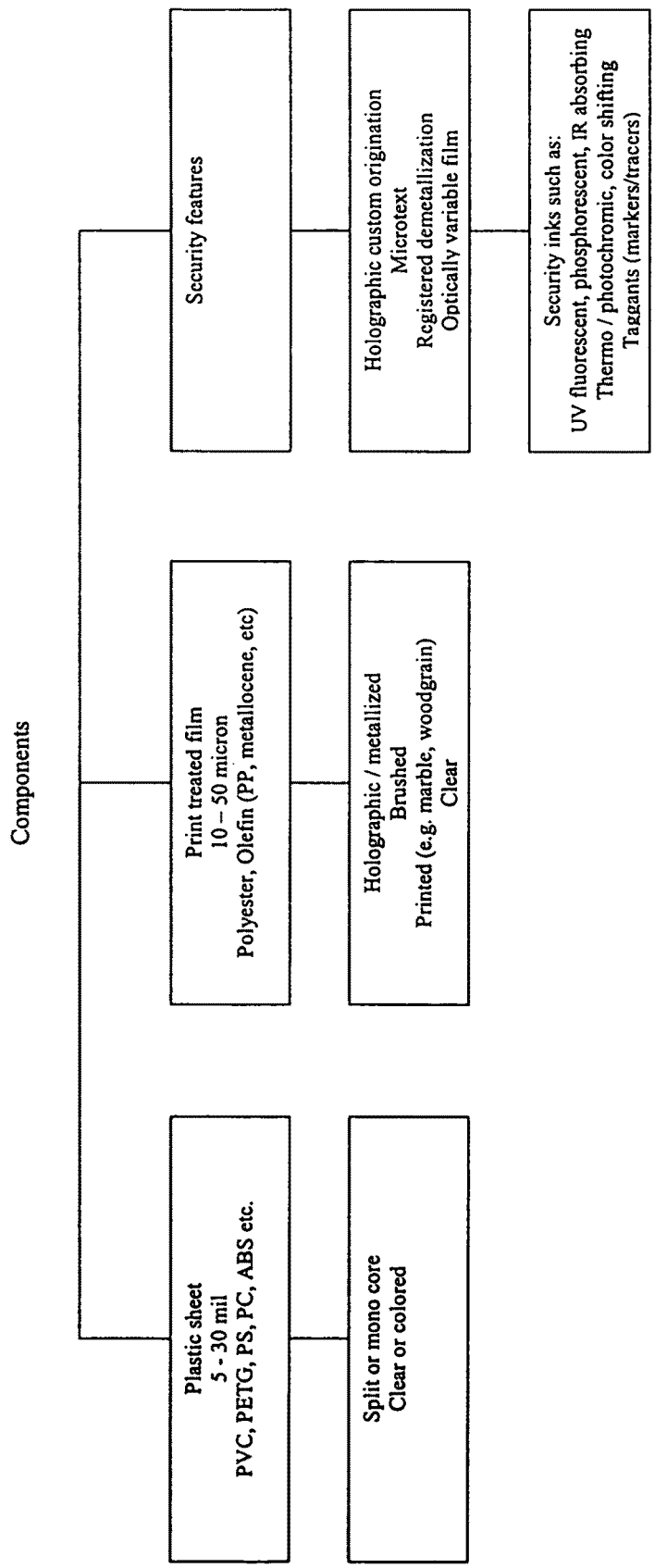
FIG. 5 is a chart summarizing the various components which may be selectively incorporated into the laminate sheet and card construction.

FIG. 5 illustrates various features that can be selectively incorporated into the laminated sheets or cards, allowing customization of the laminated sheets or cards.

For transaction cards, the sheets 4 are preferably 12 mil PVC copolymer. However, the sheets can range from approximately 5 to 30 mil, especially for other sheet stock to produce other card types, such as ID cards, phone cards, gift cards, loyalty cards, casino cards, etc. The sheets can be clear, translucent or colored. Alternate materials can also be used, for example, PVC homopolymer, PET, APET, PETG, PC, PS, ABS, acrylic, olefins such as PE/PP, HIPS, paper and board stock. The cards can have a split core (two sheets) or mono core (one sheet). PVC homopolymer is not typically employed for split core lamination, but is suitable for mono-core lamination.

The film 1 is preferably 12-23 um low haze, heat stable, print treated biaxially oriented PET. However, the film can range from approximately 10-50 um. Alternate film materials can also be used, for example, APET, PETG, PBT, OPP, PVC, acrylic, PC, PS, ABS, HIPS and co-extruded films. Olefinic films (PP, metallocene catalyzed, etc.) can be used for certain applications not demanding post lamination processes, or requiring ANSI/ISO performance. Specific functional and aesthetic coatings can be applied to the film to provide the desired security features, performance and appearance, as discussed below. The film can be metallized (vapor deposited metal or other compounds), holographic, brushed, printed (e.g., graphics, logos, indicia, marble, woodgrain, etc.), tint or clear, and may include layered security features as discussed below.

The security features in the film can be layered and can take many different forms, which may be overt or covert. For example, the film may include custom holographic imagery that can be in a wallpaper pattern or with images specifically registered to the sheet or final card. The holographic originations may include one or more of the following: microtext, 2D or 3D images, or morphing holograms, and the like. The film may include selective demetallization, or in the case of embossed films with or without indexing out the holographic image. The film may include a vacuum deposited metal, other compounds or high refractive index layer. The film may be coated or printed with optically variable materials.

Further, inks or additives may be provided on or in coatings on the film. Examples of such inks or additives include UV fluorescent, phosphorescent, pearlesence, IR absorbing/reflecting, color shifting (OVI), thermochromic, photochromic, taggants, markers, tracers, magnetic ink, in patterns (such as barcodes, readable images, or arrays), or tamper-evident elements.

These security features, inks or additives can be applied to the film in various manners. For example, they can be applied in a flood coat (covering the entire film); they can be coated in a continuous pattern (such as a wallpaper type pattern); they can be coated in a pattern of registered print; or they can coated with machine readable features/print.

The type of adhesive used, how the adhesive is applied, or whether the coatings are laminated to the sheet as a laminate with the film or transferred from the film, is generally dependent on factors such as what feature or features are being incorporated into the laminated sheet or card, production costs, performance criteria, etc.

Where the adhesive is applied by the coating station, the adhesive is preferably a water-based laminating adhesive, which is 100% solvent free. Such an adhesive has a peel strength well above the minimum requirement, and is suitably water and chemical resistant, per ANSI/ISO 7810 standards. Where the adhesive is pre-coated onto the film, a heat seal adhesive is preferably used. This adhesive can be water or solvent based or extrusion coated. In either instance, the adhesive is custom formulated for each sheet stock to optimize adhesion to the sheet stock and meet any ultimate performance requirements. The film may or may not have a tie coat to improve bond between film/coating and the sheet stock.

Accordingly, the disclosed process and product made by the process exhibit numerous improvements and benefits in sheet and card laminates, such as no roll curl set, availability of mono-core substrates, alternate plastics to PVC, and higher peel strength. Further, the sheet and card laminates disclosed herein meets ANSI/ISO requirements without a second (final) lamination. Still further, holographic, demetallized and printed imagery on the film can be laminated to the sheet or card stock in register. Additionally, downstream print artwork can be registered with the film imagery on the laminated sheet after the sheets are laminated. For example, in the first case the film could be printed in register to a holographic or demetallized pattern on the film. In the latter, individual laminated sheets having a series of images across the sheet could be printed in register using various type of sheet fed printing presses.

It is to be understood that the embodiment(s) herein described is/are merely illustrative of the principles of the present invention. Various modifications may be made by those skilled in the art without departing from the spirit or scope of the claims which follow.

What is claimed is:

1. A lamination process to produce sheets of core stock each comprising a plurality of sections which can be cut into individual cards, comprising the steps of:
    applying one or more security, functional or decorative coatings to a film or foil layer;
    feeding the film or foil layer to a lamination nip;
    feeding a sheet of a core substrate layer to the lamination nip;
    registering the sheet of a core substrate layer with the film or foil layer having the one or more security, functional or decorative coatings;
    laminating the film or foil layer having the one or more security, functional or decorative coatings to the sheet of core substrate layer to produce a laminated core stock having a plurality of sections which can be cut into individual cards and comprising the film or foil layer, the one or more security, functional or decorative coatings, and the core substrate layer, wherein each of the plurality of sections includes the one or more security, functional or decorative coatings; and
    constructing a composite laminate sheet from the laminated core stock by applying at least one outer layer to the laminated core stock, wherein the one or more security, functional or decorative coatings are buried in the construction of the laminated core stock.

2. The process of claim 1, wherein the sheet of core substrate layer is a generally flat sheet.

3. The process of claim 2, wherein the generally flat sheet is supplied from a stack of sheets.

4. The process of claim 1, where the coatings include at least one security, functional or decorative feature or layer.

5. The process of claim 4, wherein the security feature is one of holographic imagery that can be a custom image that is specifically registered, that can have selective demetallization of a vacuum deposited metal or other compounds or high refractive index, or that can be morphing holograms, barcodes, machine readable images, or arrays.

6. The process of claim 4, wherein the security feature is an ink or additive including one of UV fluorescent, photoluminescent, phosphorescent, IR absorbing/reflecting, color shifting (OVI or OVD), thermochromic, photochromic, taggants, markers, tracers, barcodes, readable images, arrays, or tamper-evident elements.

7. The process of claim 4, wherein the functional feature is at least one of a performance coating imparting heat, chemical, UV or abrasion resistance, or a coating or treatment that modifies the coefficient of friction or antistatic property.

8. The process of claim 4, wherein the decorative feature is at least one of a tint coat, texture coat, graphics, indicia, woodgrain, argent, stone or marble pattern.

9. The process of claim 1, wherein the step of laminating includes the use of an adhesive which is water based.

10. The process of claim 1, wherein the laminated core stock is split core.

11. The process of claim 1, wherein the core substrate layer comprises PVC copolymer, PVC homopolymer, PET, APET, PETG, PC, PS, ABS, PBT, acrylic, PE/PP, or HIPS.

12. The process of claim 1, wherein the film or foil layer comprises PET, APET, PETG, PBT, OPP, other olefins, PVC, acrylic, HIPS, PS, PC or co-extruded films.

13. The process of claim 1, wherein the film or foil layer includes at least one distinguishing mark or image, and the step of registering includes the step of aligning the at least one distinguishing mark or image with a select location on each sheet of core substrate layer.

14. The process of claim 4, wherein the security feature is one of holographic imagery that can be in a wall paper pattern, that can have selective demetallization of a vacuum deposited metal or other compounds or high refractive index, or that can be morphing holograms, barcodes, machine readable images, arrays, optically variable coatings, microtext, or 2D or 3D images.

15. The process of claim 1, wherein the step of laminating includes the use of an adhesive which is solvent based.

16. The process of claim 1, wherein the step of laminating includes the use of an adhesive which is heat seal or hot melt.

17. The process of claim 1, wherein the step of laminating includes the use of an adhesive which is radiation curable.

18. The process of claim 1, wherein the laminated core stock is mono-core.

19. The process of claim 1, wherein the at least one outer layer comprises one or more layers of graphic print or indicia, or a protective overlay layer, or one or more layers of graphic print or indicia and a protective overlay layer, or is configured to receive graphic print or indicia or a protective overlay.

20. The process of claim 1, wherein at least one outer layer is applied to the film or foil layer, wherein the at least one outer layer comprises one or more layers of graphic print or indicia, or a protective overlay layer, or one or more layers of graphic print or indicia and a protective overlay layer, or is configured to receive graphic print or indicia or a protective overlay.

21. A lamination process for producing a composite laminate sheet, comprising the steps of:
laminating a film or foil layer to a core substrate layer, wherein the film or foil layer includes at least one functional, decorative or security feature on a surface of the film or foil layer to produce a sheet of laminated core stock comprising the film or foil layer, the at least one functional, decorative or security feature, and the core substrate layer;
applying at least one outer layer to the sheet of laminated core stock, wherein the at least one outer layer comprises one or more layers of graphic print or indicia, or a protective overlay layer, or one or more layers of graphic print or indicia and a protective overlay layer, or is configured to receive graphic print or indicia or a protective overlay;
wherein the at least one functional, decorative or security feature is buried within the sheet of laminated core stock during construction;
affixing an additional sheet of laminated core stock to the sheet of laminated core stock, the additional sheet of laminated core stock having an additional film or foil layer laminated to an additional core substrate layer, wherein the additional film or foil layer includes at least one additional functional, decorative or security feature on a surface of the additional film or foil layer; and
applying at least one additional outer layer to the additional sheet of laminated core stock, wherein the at least one additional outer layer comprises one or more layers of graphic print or indicia, or a protective overlay layer, or one or more layers of graphic print or indicia and a protective overlay layer, or is configured to receive graphic print or indicia or a protective overlay;
wherein the at least one additional functional, decorative or security feature is buried within the additional sheet of laminated core stock during construction.

22. A lamination process for producing a composite laminate sheet, comprising the steps of:
laminating a film or foil layer to a first core substrate layer, wherein the film or foil layer includes at least one functional, decorative or security feature on a surface of the film or foil layer; and
affixing a second core substrate layer to the film or foil layer;
wherein the film or foil layer having the at least one functional, decorative or security feature is buried between the first core substrate layer and the second core substrate layer.

23. The process of claim 22, further comprising:
applying at least one outer layer to the first core substrate layer, wherein the at least one outer layer comprises one or more layers of graphic print or indicia, or a protective overlay layer, or one or more layers of graphic print or indicia and a protective overlay layer.

24. The process of claim 22, further comprising:
applying at least one outer layer to the second core substrate layer, wherein the at least one outer layer comprises one or more layers of graphic print or indicia, or a protective overlay layer, or one or more layers of graphic print or indicia and a protective overlay layer.

25. The process of claim 23, further comprising:
applying at least one outer layer to the second core substrate layer, wherein the at least one outer layer applied to the second core substrate layer comprises one or more layers of graphic print or indicia, or a protective overlay layer, or one or more layers of graphic print or indicia and a protective overlay layer.

26. The process of claim 22, further comprising the step of applying one or more layers of graphic print or indicia to the film or foil layer.

* * * * *